Nov. 13, 1956  H. L. BOWDITCH  2,770,258
DIFFERENTIAL PRESSURE RESPONSIVE ASSEMBLY
Filed Sept. 20, 1954  2 Sheets-Sheet 1
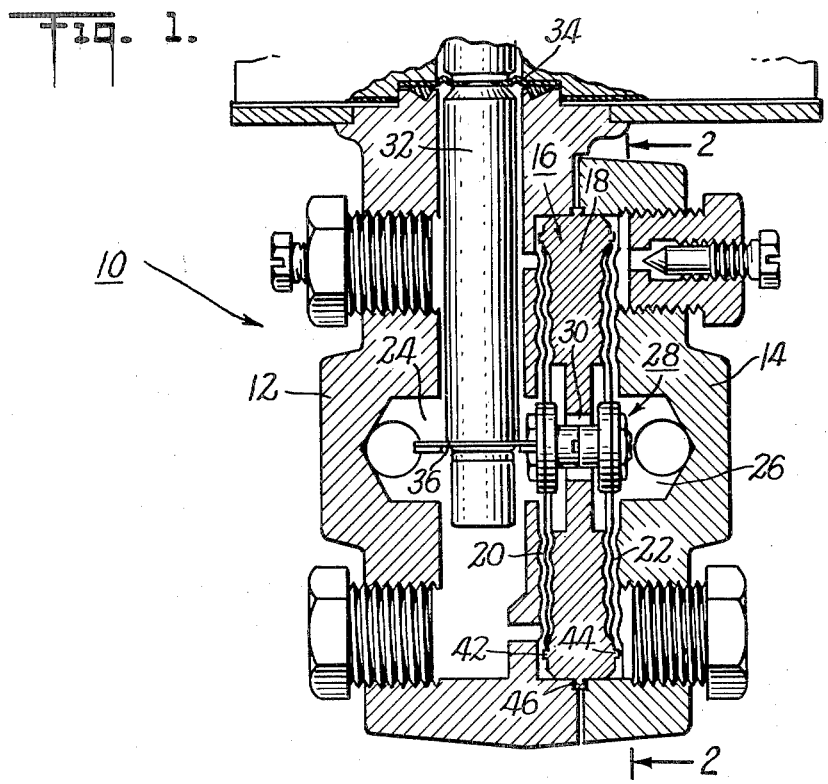
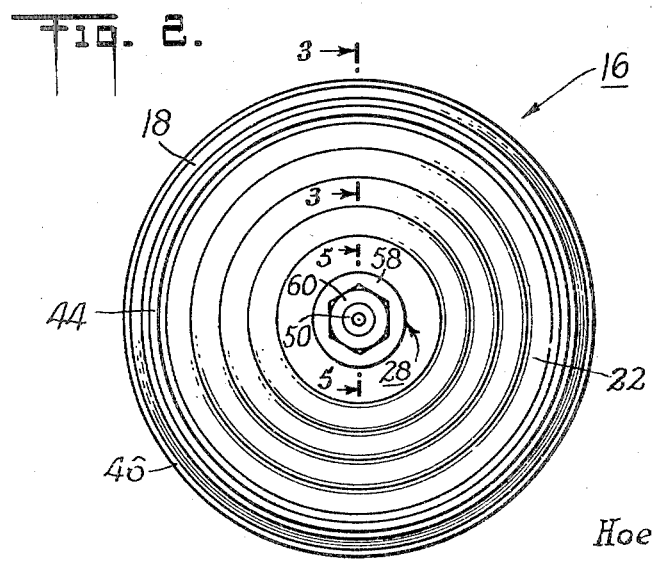
INVENTOR
Hoel L. Bowditch
BY
Curtis, Morris & Safford
ATTORNEYS

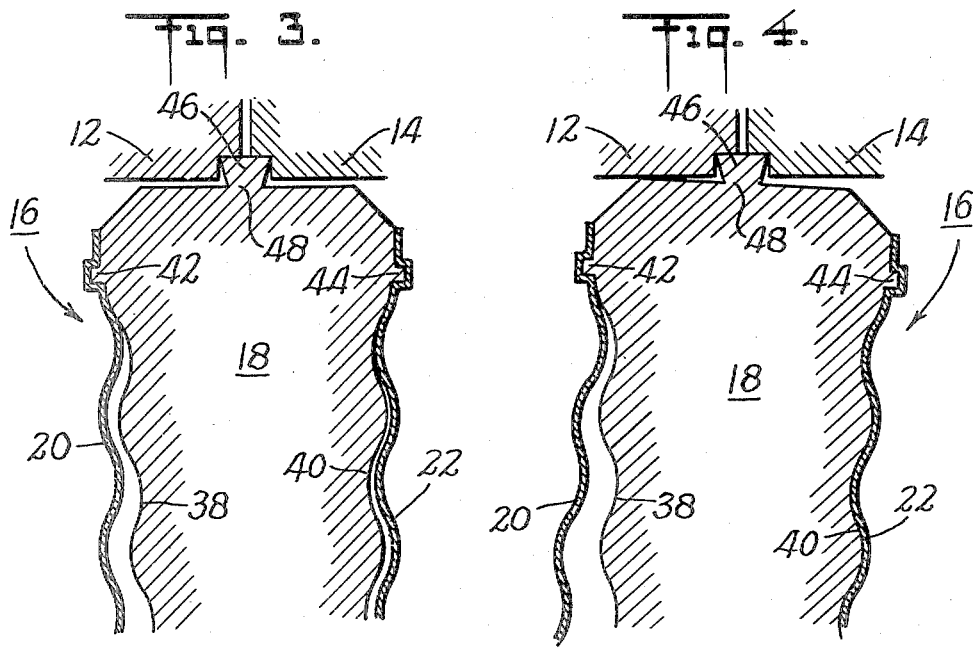
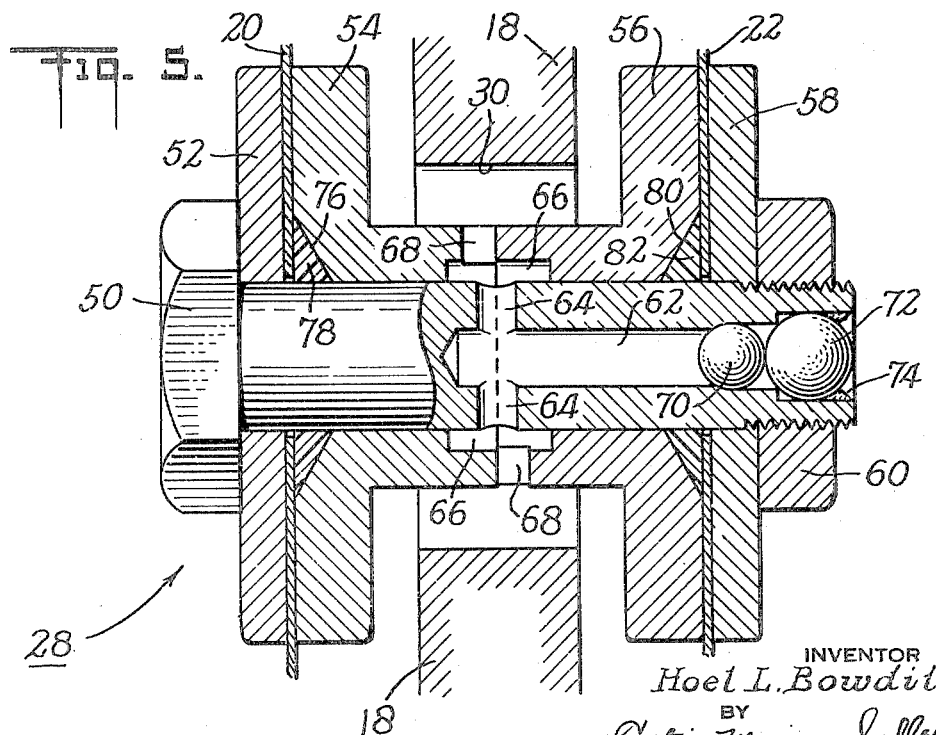

United States Patent Office 2,770,258
Patented Nov. 13, 1956

2,770,258

DIFFERENTIAL PRESSURE RESPONSIVE ASSEMBLY

Hoel L. Bowditch, Foxboro, Mass., assignor to The Foxboro Company, Foxboro, Mass., a corporation of Massachusetts Application September 20, 1954, Serial No. 457,161

8 Claims. (Cl. 137—787)

This invention relates to the measurement of differential pressure and more particularly to a novel differential pressure responsive diaphragm assembly adapted to be used in differential pressure measuring instruments which may indicate, record, or control the differential pressure, or transmit the value of measured differential pressure to another instrument or regulating device located at a remote point. Typical differential pressure measuring instruments of the kind with which the present diaphragm assembly can be advantageously used are disclosed in Cook Patent 2,539,892 and Bowditch application Serial No. 453,632 filed September 1, 1954.

Measuring instruments of the type shown in the Cook patent and Bowditch application comprise a two-part casing having a resilient corrugated metal diaphragm clamped therebetween. The diaphragm divides the interior of the casing into two chambers which communicate respectively with the two pressures between which the difference is to be measured. The resultant force on the resilient diaphragm is transmitted by a force bar or rod through a flexible portion of the casing wall and the transmitted force is measured externally of the casing by a pneumatic force balancing unit.

In the industrial operation of such instruments it occasionally happens that one or the other of the chambers within the casing is vented to atmosphere, either through inadvertence or by design, thereby establishing a pressure difference across the diaphragm much larger that that which the instrument is intended to measure. In order to avoid excessive deflection and permanent distortion of the diaphragm under such circumstances it is necessary to provide some form of reinforcement which will limit the deflection of the diaphragm to its normal operating range and support the diaphragm during the period when it is subjected to such over-range pressures. In the Cook patent and Bowditch application referred to above this objective is achieved by providing the portions of the casing that confront the diaphragm with convolutions that correspond with the corrugations of the diaphragm and establishing a spacing between the convoluted surfaces of the casing parts that permits a desired range of deflection of the diaphragm but prevents excessive deflection.

While such convoluted supporting surfaces on the two sides of the diaphragm should theoretically eliminate distortion of the diaphragm under over-range conditions, it has been found in practice that a small amount of distortion still occurs. It is not possible to form the convolutions on the two surfaces of the casing that confront the opposite sides of the diaphragm in such manner that they conform precisely with the corrugations of the diaphragm. Thus when the diaphragm is forced against one of the convoluted surfaces by a high over-range pressure, it is deformed by the small amount that is necessary to cause it to fit tightly against the convoluted supporting surface. If thereafter the diaphragm is subjected to a high over-range pressure on its opposite side, it is forced thereby to conform to the convolutions of the other convoluted supporting surface and is thereby again deformed a small amount.

It has further been found important in minimizing distortion of the diaphragm that the outermost convolution of the supporting surface be concave and not convex, so that the outermost corrugation of the diaphragm fits into it and the peripheral portion of the diaphragm is thereby maintained in tension under over-range conditions. It is evident that with the structure shown in Cook Patent 2,539,892 wherein the diaphragm is mounted between two supporting surfaces the outermost convolution of at least one of the surfaces must be convex.

While the amount of diaphragm distortion that occurs under the conditions outlined above is quite small, it is a significant factor in the operation of instruments of the type referred to herein. As pointed out above, the force-bar that transmits the force exerted by the diaphragm through the casing wall cooperates at its external end with a pneumatic balancing system. The operation of the pneumatic system is such that the normal range of movement of the force bar is no more than a few thousandths of an inch, and hence a very small amount of diaphragm distortion is sufficient to introduce a significant error in measurement.

In the use of such instruments for measuring the differential pressure of liquids, an undesirable pumping action may occur. This is especially true when the pneumatic force balance mechanism is made highly sensitive. The pumping action is caused by the reaction of the pneumatic force balance mechanism producing a feed-back motion of the diaphragm which will displace momentarily the column of liquid in the pressure transmitting pipes connecting the instrument to the process. This pumping action makes it difficult, if not impossible, to interpret the measurement accurately. When these instruments are used to measure dynamic pulsating differential pressures, as for example those produced by a reciprocating pump, it is similarly difficult, if not impossible, to interpret the measurement accurately. In addition, such pulsating differential pressures will materially shorten the serviceable life of the diaphragm and associated parts.

It is accordingly an object of the present invention to provide an improved diaphragm assembly for use in differential pressure-measuring instruments. It is another object of the invention to provide a diaphragm assembly for this purpose which gives effective support to the diaphragm under over-range pressure conditions and minimizes diaphragm distortion under these conditions. It is still another object of the invention to provide a diaphragm assembly including a pressure-responsive diaphragm that returns precisely to neutral or zero position after it has been subjected to substantial over-range pressures. It is still another object of this invention to provide a diaphragm assembly which, in combination with a highly sensitive pneumatic force balance mechanism used to measure the differential pressure of liquids, will produce a stable measurement with the wear of the parts of the mechanism reduced to a minimum. Other objects of the invention will be in part obvious and in part pointed out hereafter.

The many objects and advantages of the present invention can best be understood and appreciated by reference to the accompanying drawings which illustrate a diaphragm assembly incorporating a preferred embodiment of the present invention and wherein:

Figure 1 is a vertical central section through the lower portion of the casing of a force-balanced differential pressure measuring instrument and shows a diaphragm assembly according to the present invention mounted therein (in the several views of the drawings the distances between the back-up plate and the diaphragms are exaggerated to indicate more clearly the manner in which the structure operates);

Figure 2 is a side elevation of the diaphragm assembly as viewed from the plane 2—2 of Figure 1;

Figure 3 is an enlarged fragmentary vertical section taken on the line 3—3 of Figure 2 and showing the positions of the back-up plate and diaphragms under normal operating conditions;

Figure 4 is a view similar to Figure 3 but showing the position of the parts when subjected to over-range pressures; and Figure 5 is a fragmentary vertical section through the assembly, also on an enlarged scale, taken on the line 5—5 of Figure 2 and showing details of the means for interconnecting the two diaphragms.

Referring to the drawings and more particularly to Figure 1, the numeral 10 generally designates the lower casing of a differential pressure transmitter of the type disclosed in Bowditch application Serial No. 453,632, referred to above. The casing 10 comprises a body 12 and cover 14 that are bolted together by suitable bolts (not shown) and have clamped therebetween a diaphragm assembly 16. The assembly 16 comprises in general a back-up plate 18 having two corrugated resilient metal diaphragms 20 and 22 secured at their peripheries to opposite sides of the back-up plate.

The diaphragm assembly 16 divides the interior of casing 10 into two chambers 24 and 26, one of which communicates with each of the two pressures of which the differential is to be measured. Thus the external surface of diaphragm 20 is exposed to the pressure in chamber 24 and the external surface of diaphragm 22 is exposed to the pressure in chamber 26.

Referring to Figure 2 as well as to Figure 1, the two diaphragms 20 and 22 are of generally circular configuration with circular corrugations and are interconnected at their centers by a connection 28 which is described in detail hereafter and which passes freely through a central opening 30 in the back-up plate 18. Thus, when a pressure difference is established between the chambers 24 and 26, the diaphragms 20 and 22 and the connection 28 tend to move toward the lower pressure chamber. Movement of the diaphragm is opposed by a force bar 32 which is mounted in a flexible diaphragm 34 forming part of the wall of the casing and is secured to the connection 28 by a link 36.

The mounting of the force bar 32 in casing 10 and its connection to the diaphragm assembly are more fully described in Bowditch application Serial No. 453,632 referred to above. It is also pointed out in the Bowditch application that the external end of force bar 32 cooperates with a pneumatic balancing system that operates to generate a pressure opposing the movement of the external end of the force bar in such manner that the differential force applied to diaphragm assembly 16 is converted into a corresponding pneumatic pressure with only a very small movement of the diaphragms 20 and 22 and the force bar 32.

Referring now to Figures 3 and 4 of the drawings, back-up plate 18 has a surface 38 that is provided with convolutions that match the corrugations of the diaphragm 20. In like manner, the opposite surface 40 of back-up plate 18 is provided with convolutions that match the corrugations of the diaphragm 22. It is desirable that the diaphragms 20 and 22 be pressed against the surfaces 38 and 40 respectively under high pressure prior to final adjustment of the instrument so that the diaphragm corrugations and surface convolutions on the back-up plate surfaces will match precisely. Since each of the diaphragms 20 and 22 has only a single back-up surface to which it must conform, the difficulties outlined above in connection with structures where a single diaphragm is positioned between two back-up surfaces are avoided by the present structure.

The back-up plate 18 is provided with a relatively narrow peripheral ridge 42 over which the peripheral portion of the diaphragm 20 is formed and to which the diaphragm is secured in any suitable manner such as by welding, brazing, soldering, or the like. In like manner the diaphragm 22 is secured to a peripheral ridge 44 on the opposite side of backup plate 18. It will be noted that the outermost corrugation of each diaphragm 20 and 22 is convex inwardly and thus the peripheral portion of each diaphragm is under tension when it is forced against the mating surface of the back-up plate.

The back-up plate may be made relatively thick to avoid distortion when subject to over-range pressures. However, when the thickness of the back-up plate is reduced to a minimum practical dimension as a means of reducing its weight, the manner of mounting of the diaphragm assembly in the casing has been found to have an important bearing on its proper operation. Thus it has been found that if the diaphragm assembly is rigidly clamped between the casing parts and the assembly is then subjected to heavy over-range pressures, the central portion of the back-up plate is deflected somewhat and does not return precisely to its original position, due to a shift of the clamped portion of the diaphragm assembly relative to the casing parts. After the over-range pressure has been removed, the back-up plate is held deflected in a new position because of the clamping friction, resulting in a displacement of the mid-point between the diaphragms at zero differential pressure, and thereby introducing an error into the measurement.

To overcome this problem the present diaphragm assembly has a flexible mounting. As shown in Figures 3 and 4, the periphery of the back-up plate 18 is spaced slightly from the adjacent walls of the casing and the periphery of the back-up plate is provided with an outwardly extending flexure ring or member 46 which is of trapezoidal cross-section, that is, it has a relatively narrow neck portion at the point where it merges into the main body of the back-up plate. The diaphragm assembly is mounted in the casing by clamping the ring 46 between the casing parts 12 and 14. Thus when the diaphragm assembly is subjected to an over-range pressure, it flexes at the neck portion 48 as particularly shown in Figure 4 and the back-up plate 18 assumes a bow-shaped configuration. It has been found that with this construction when the over-range pressure is removed the back-up plate 18 returns precisely to its original position and hence there is no displacement of the zero position of the diaphragm assembly.

As pointed out above, the diaphragms 20 and 22 are interconnected by a connection 28 that passes through an opening 30 in the back-up plate, and the details of this connection are best shown in Figure 5 of the drawings. Referring to Figure 5, the diaphragms are held in fixed relation at their centers by a bolt 50 that passes in sequence through a washer 52 which bears against the external surface of diaphragm 20, a central hole in diaphragm 20, a bushing 54 which bears against the inner surface of diaphragm 20, a second and similar bushing 56 that bears against the inner surface of diaphragm 22, a central hole in diaphragm 22, and a washer 58 that bears against the external surface of diaphragm 22. The end of bolt 50 is threaded to receive a nut 60 that is tightened to hold the washers, bushings and diaphragms 20 and 22 in fixed relation.

In a diaphragm assembly of this type it is important that the pressure against one diaphragm be applied against the other diaphragm in a precise manner in order to maintain the highest degree of accuracy of the measurement. To accomplish this, the free space within the diaphragm assembly is completely filled with a non-compressible liquid. Thus the pressure against one diaphragm is transmitted by the liquid to the other diaphragm in a precise manner. In such a liquid filled diaphragm assembly, changes in the temperature of the assembly may cause the volume of the liquid to change. Any deleterious effects of this change of volume of the liquid are substantially eliminated by reducing the free space within the diaphragm assembly to a minimum and selecting diaphragms which are substantially identical in effective area. When the diaphragms are thus matched, any change in the volume of the filling liquid will cause an equal change in the pressure applied to each diaphragm.

Means are provided in the connection 28 for introducing the liquid into the assembly. More particularly the bolt 50 is provided with a longitudinal bore 62 that communicates with a cross-bore 64 extending transversely through the bolt. The cross-bore 64 communicates with an annular passage 66 formed in the bushings 54 and 56, and passage 66 in turn communicates through slots 68, also formed in the bushings 54 and 56, with the interior of the diaphragm assembly. Thus liquid can be introduced through the end of the bolt 50, passages 62 and 64, annular passage 66, and slot 68 into the interior of the diaphragm assembly.

In filling the diaphragm assembly, its interior is first evacuated and the liquid then introduced so that the liquid will completely fill the internal space in the assembly. Thereafter a ball 70 is forced into the end of bore 62 and a second closure ball 72 is seated in a counter-bore 74 of bolt 50 and sealed in place by any suitable means such as welding or soldering or peening the end of the bolt.

In order to prevent leakage of the liquids in the diaphragm assembly, the surface of bushing 54 that bears against diaphragm 20 is provided with a conical recess 76 containing the packing 78. Bushing 56 has a similar recess 80 containing the packing 82.

As indicated above, the head of bolt 50 is rigidly secured to a link 36 (see Figure 1) which in turn is connected to the lower end of force-bar 32 in such manner that when a differential pressure is applied across the diaphragm assembly the resultant force is transmitted to the force-bar 32.

Instruments of the class of this invention, may be stabilized by attaching a dashpot to the force bar. Such a dashpot will overcome the pumping action referred to previously. However the addition of a dashpot to the external portion of the force bar will not solve the problem of the wear of the parts when the instrument is used to measure dynamic pulsating differential pressures. The liquid filled diaphragm assembly may advantageously serve as a dashpot as well as a differential pressure sensing means, eliminating the expense of an externally mounted dashpot. In using the liquid filled diaphragm assembly as a dashpot, all movement of parts is reduced to minimum when the instrument is used to measure dynamically pulsating differential pressures and hence the expected useful life of the instrument is materially increased. The liquid filled diaphragm assembly is made to serve as a dashpot by providing a restricted flow of the filling liquid from the free space on one side to the free space on the other side of the back-up plate 18. This flow of the filling liquid may be regulated by suitably proportioning the free space between central opening 30 in the back-up plate 18 and connection 28.

From the foregoing description it should be apparent that the present invention provides a structure capable of achieving the several objects set forth at the beginning of the present specification. The arrangement of the two corrugated diaphragms on opposite sides of a back-up plate having surface convolutions conforming with the corrugations of the diaphragms effectively eliminates distortion of the diaphragms, both because they are not required to conform with two different supporting surfaces and also because the outermost corrugation of each diaphragm can be made to seat in a recess in the supporting plate and thereby maintain the peripheral portions of each diaphragm in tension when it is subjected to over-range pressure. Moreover, the flexible mounting of the entire assembly permits the back-up plate to deflect under over-range conditions and at the same time insures its return to its precise original position, thereby eliminating the errors that are introduced when the diaphragm assembly is rigidly clamped at its periphery between the parts of the casing. In addition, the liquid filled diaphragm assembly serves effectively as a dashpot so that a highly sensitive pneumatic force balance mechanism may be used to advantage in this type of instrument for the measurement of the differential pressure of liquids and so that the instrument may be used satisfactorily to measure dynamic pulsating differential pressures.

It is of course to be understood that the foregoing description is illustrative only and that numerous changes can be made in the particular embodiment described without departing from the spirit of the invention as set forth in the appended claims.

I claim:

1. In differential pressure responsive apparatus, in combination, a casing, a differential pressure responsive unit in said casing, said unit comprising a metal back-up plate and a pair of resilient metal diaphragms secured at their peripheries to opposite sides of said plate to form a hermetically sealed unit, said back-up plate having a passage therethrough establishing communication between said diaphragms and a flexure member extending around the periphery of said unit and interconnecting the periphery of said unit and said casing, whereby said unit is supported in said casing through said flexure member and is movable as a unit in response to over-range differential pressures applied thereacross but returns to its original position upon equalization of the differential pressure.

2. In differential pressure responsive apparatus, in combination, a two-part casing, a differential pressure responsive unit in said casing, said unit comprising a metal back-up plate and a pair of resilient metal diaphragms secured at their peripheries to opposite sides of said plate to form a hermetically sealed unit, said back-up plate having a passage therethrough establishing communication between said diaphragms and also having a flexure ring extending outwardly from its periphery, said flexure ring being clamped between the parts of said casing, whereby said unit is supported in said casing through said flexure and is movable as a unit in response to over-range differential pressures applied thereacross but returns to its original position upon equalization of the differential pressure.

3. In differential pressure responsive apparatus of the type that includes a casing, a differential pressure responsive unit in said casing, said unit comprising a substantially rigid, metal back-up plate and a pair of corrugated metal diaphragms secured at their peripheries to opposite sides of said plate to form a hermetically sealed unit, each of said diaphragms being normally slightly spaced from the adjacent side of said back-up plate to permit a limited amount of inward deflection of said each diaphragm in response to externally applied pressure, whereby said back-up plate serves to prevent excessive deflection and consequent permanent distortion of said each diaphragm, the opposite sides of said back-up plate being provided with convolutions that conform with the diaphragm corrugations, whereby when excessively high pressures are applied to one of said diaphragms the diaphragm seats snugly against said back-up plate and the plate prevents permanent distortion of said diaphragm, said back-up plate having a passage therethrough establishing communication between said diaphragms, the combination with said differential pressure responsive unit of a flexure member that extends around the periphery of said unit and interconnects the periphery of said unit and said casing, whereby said unit is supported in said casing through said flexure member and is movable as a unit in response to over-range differential pressures applied thereacross but returns to its original position upon equalization of the differential pressure.

4. In differential pressure responsive apparatus of the type that includes a two-part casing, a differential pressure responsive unit in said casing, said unit comprising a substantially rigid, metal back-up plate and a pair of corrugated metal diaphragms secured at their peripheries to opposite sides of said plate to form a hermetically sealed unit, each of said diaphragms being normally slightly spaced from the adjacent side of said back-up plate to permit a limited amount of inward deflection of said diaphrams in response to externally applied pressure, the opposite sides of said back-up plate being provided with convolutions that conform with the diaphragm corrugations, whereby when excessively high pressures are applied to one of said diaphragms, the diaphragm seats snugly against said back-up plate and the plate prevents permanent distortion of said diaphragm, said back-up plate having a passage therethrough establishing communication between said diaphragms, said diaphragms being connected by a mechanical connection extending through said passage, and the free space within said unit being substantially completely filled with liquid, the combination with said differential pressure responsive unit of a flexure ring that extends outwardly from said back-up plate and is secured between the parts of said casing, whereby said unit is supported in said casing through said flexure and is movable as a unit in response to over-range differential pressures applied thereacross but returns to its original position upon equalization of the differential pressure.

5. In differential pressure responsive apparatus in combination, a two-part casing, a differential pressure responsive unit in said casing, said unit comprising a substantially rigid support and a resilient diaphragm secured thereto, said support having an outwardly extending flexure member extending around its periphery, said flexure member being clamped between the parts of said casing whereby said unit is supported in said casing through said flexure member and is movable as a unit in response to over-range differential pressures applied there-across but returns to its original position on equalization of the differential pressure.

6. In differential pressure responsive apparatus in combination, a two-part casing, a differential pressure responsive unit in said casing, said unit comprising a back-up plate and at least one resilient metal diaphragm secured at its periphery to said plate, and a flexure member extending around the periphery of said unit, said flexure member being clamped between the parts of said casing, whereby said unit is supported in said casing through said flexure member and is movable as a unit in response to over-range differential pressures applied there-across but returns to its original position upon equalization of the differential pressure.

7. In differential pressure responsive apparatus in combination, a two-part casing, a differential pressure responsive unit in said casing, said unit comprising a back-up plate and at least one resilient metal diaphragm secured at its periphery to said back-up plate, said diaphragm being normally slightly spaced from the adjacent side of said back-up plate to permit a limited amount of inward deflection of said diaphragm in response to external pressure applied thereto, and a flexure member extending around the periphery of said unit, said flexure member being clamped between the parts of said casing whereby said unit is supported in said casing through said flexure member and is movable as a unit in response to over-range differential pressure applied there-across but returns to its original position upon equalization of the differential pressure.

8. A differential pressure responsive apparatus according to claim 5 and wherein the portion of said flexure member clamped between the parts of said casing is wider than the portion of said flexure member adjacent to said responsive unit, thereby forming a neck portion of said flexure member adjacent to said responsive unit wherein most of the flexing occurs when said responsive unit moves in response to over-range differential pressures applied thereacross.

References Cited in the file of this patent
UNITED STATES PATENTS

| 1,461,086 | Fesler | July 10, 1923 |
| 2,297,678 | Allen | Oct. 6, 1942 |
| 2,645,248 | Baker | July 14, 1953 |

FOREIGN PATENTS

| 630,529 | Germany | May 29, 1936 |